US011679545B2

(12) United States Patent
Wohlgemuth (10) Patent No.: US 11,679,545 B2
(45) Date of Patent: Jun. 20, 2023

(54) DEVICE FOR PRODUCING AT LEAST ONE THREE-DIMENSIONAL LAMINATE FOR THE CONSTRUCTION INDUSTRY

(71) Applicants: Progress Maschinen & Automation AG, Brixen (IT); METALLCONCEPT GmbH, Sarnthein (IT)

(72) Inventor: Kurt Wohlgemuth, Sarnthein (IT)

(73) Assignees: PROGRESS MASCHINEN & AUTOMATION AG, Brixen (IT); METTALLCONCEPT GMBH, Sarnthein (IT)

( * ) Notice: Subject to any disclaimer, the term of this patent is extended or adjusted under 35 U.S.C. 154(b) by 400 days.

(21) Appl. No.: 16/260,765

(22) Filed: Jan. 29, 2019

(65) Prior Publication Data

US 2019/0168443 A1   Jun. 6, 2019

Related U.S. Application Data

(63) Continuation of application No. PCT/EP2017/069690, filed on Aug. 3, 2017.

(30) Foreign Application Priority Data

Aug. 5, 2016 (AT) .............................. A 50722/2016

(51) Int. Cl.
*B29C 64/165* (2017.01)
*B29C 64/106* (2017.01)
(Continued)

(52) U.S. Cl.
CPC ............. *B29C 64/106* (2017.08); *B25J 9/026* (2013.01); *B29C 64/165* (2017.08);
(Continued)

(58) Field of Classification Search
CPC ... B29C 64/153; B29C 64/268; B29C 64/245; B29C 64/343; B29C 64/282;
(Continued)

(56) References Cited

U.S. PATENT DOCUMENTS 5,940,674 A * 8/1999 Sachs ...................... B22F 3/115
419/2
7,104,773 B2   9/2006 Maekawa et al.
(Continued)

FOREIGN PATENT DOCUMENTS

CN           203887172        10/2014
DE    10 2006 030 350          1/2008
(Continued)

OTHER PUBLICATIONS

Patent Translate, "Description CN203887172U", Feb. 23, 2021, EPO and Google. (Year: 2021).*
(Continued)

*Primary Examiner* — Joseph S Del Sole
*Assistant Examiner* — Margaret B Hayes
(74) *Attorney, Agent, or Firm* — Wenderoth, Lind & Ponack, L.L.P.

(57) ABSTRACT

A device for producing a three-dimensional laminate for the construction industry from a plurality of layers of particulate material, which layers are arranged one on top of the other on a printing platform, are consolidated in locally predetermined regions, and are bonded to one another to form a three-dimensional laminate. The device includes a printing frame and at least two coating devices for applying the particulate material layer by layer on the printing platform. The at least two coating devices are movably mounted on the printing frame, preferably along a longitudinal guide. A printing head is provided for discharging a binder at the locally predetermined regions, and the printing head is
(Continued)

movably mounted on the printing frame, preferably along at least one longitudinal guide. The at least two coating devices and the printing head are in each case movable in relation to one another.

16 Claims, 5 Drawing Sheets

(51) Int. Cl.
    *B33Y 10/00*     (2015.01)
    *B33Y 30/00*     (2015.01)
    *B29C 64/205*     (2017.01)
    *B33Y 40/00*     (2020.01)
    *B25J 9/02*     (2006.01)

(52) U.S. Cl.
    CPC ............ *B29C 64/205* (2017.08); *B33Y 10/00* (2014.12); *B33Y 30/00* (2014.12); *B33Y 40/00* (2014.12)

(58) Field of Classification Search
    CPC ... B29C 64/241; B29C 64/205; B29C 64/255; B29C 64/336; B29C 64/393; B29C 2791/008; B29C 64/165; B29C 64/321; B29C 64/329; B22F 2003/1058; B22F 2003/1056; B22F 2003/1057; B28B 1/001; B33Y 30/00; B33Y 10/00
    See application file for complete search history.

(56) References Cited

U.S. PATENT DOCUMENTS

| | | | |
|---|---|---|---|
| 7,153,454 B2 | 12/2006 | Khoshnevis | |
| 7,452,196 B2 | 11/2008 | Khoshnevis | |
| 7,574,925 B2 | 8/2009 | Khoshnevis | |
| 7,641,461 B2 | 1/2010 | Khoshnevis | |
| 7,736,578 B2 | 6/2010 | Ederer | |
| 7,814,937 B2 | 10/2010 | Khoshnevis | |
| 7,837,378 B2 | 11/2010 | Khoshnevis | |
| 7,841,849 B2 | 11/2010 | Khoshnevis | |
| 7,841,851 B2 | 11/2010 | Khoshnevis | |
| 7,850,388 B2 | 12/2010 | Khoshnevis | |
| 7,874,825 B2 | 1/2011 | Khoshnevis | |
| 7,878,789 B2 | 2/2011 | Khoshnevis | |
| 7,927,539 B2 | 4/2011 | Ederer | |
| 8,029,258 B2 | 10/2011 | Khoshnevis | |
| 8,029,710 B2 | 10/2011 | Khoshnevis | |
| 8,308,470 B2 | 11/2012 | Khoshnevis | |
| 8,518,308 B2 | 8/2013 | Khoshnevis | |
| 8,568,121 B2 | 10/2013 | Khoshnevis | |
| 8,801,415 B2 | 8/2014 | Khoshnevis | |
| 8,944,799 B2 | 2/2015 | Khoshnevis | |
| 8,992,679 B2 | 3/2015 | Khoshnevis | |
| 9,162,486 B2 | 10/2015 | Motoyanagi | |
| 9,174,391 B2 | 11/2015 | Hartmann et al. | |
| 9,206,601 B2 | 12/2015 | Khoshnevis | |
| 9,815,241 B2* | 11/2017 | Pforte | B29C 66/41 |
| 9,878,494 B2 | 1/2018 | Hartmann et al. | |
| 9,914,169 B2* | 3/2018 | Ederer | B29C 64/153 |
| 9,993,975 B2 | 6/2018 | Hartmann et al. | |
| 10,434,710 B2* | 10/2019 | Todorov | B22C 9/02 |
| 2001/0050448 A1 | 12/2001 | Kubo et al. | |
| 2002/0090410 A1* | 7/2002 | Tochimoto | B29C 64/357 |
| | | | 425/215 |
| 2004/0164436 A1 | 8/2004 | Khoshnevis | |
| 2005/0194401 A1 | 9/2005 | Khoshnevis | |
| 2005/0196482 A1 | 9/2005 | Khoshnevis | |
| 2005/0196484 A1 | 9/2005 | Khoshnevis | |
| 2005/0280185 A1 | 12/2005 | Russell et al. | |
| 2006/0054039 A1* | 3/2006 | Kritchman | B33Y 40/00 |
| | | | 427/256 |
| 2007/0138678 A1 | 6/2007 | Khoshnevis | |
| 2007/0138687 A1 | 6/2007 | Khoshnevis | |
| 2007/0148006 A1 | 6/2007 | Khoshnevis | |
| 2007/0181519 A1 | 8/2007 | Khoshnevis | |
| 2007/0286674 A1 | 12/2007 | Khoshnevis | |
| 2008/0001331 A1 | 1/2008 | Ederer | |
| 2008/0017663 A1 | 1/2008 | Khoshnevis | |
| 2008/0121013 A1 | 5/2008 | Khoshnevis | |
| 2009/0043424 A1 | 2/2009 | Khoshnevis | |
| 2009/0134539 A1 | 5/2009 | Khoshnevis | |
| 2009/0134540 A1 | 5/2009 | Khoshnevis | |
| 2010/0025349 A1 | 2/2010 | Khosnevis | |
| 2010/0112119 A1 | 5/2010 | Khoshnevis | |
| 2010/0136340 A1 | 6/2010 | Khoshnevis | |
| 2010/0243123 A1 | 9/2010 | Ederer | |
| 2010/0257792 A1 | 10/2010 | Khoshnevis | |
| 2010/0318222 A1 | 12/2010 | Khoshnevis | |
| 2011/0076350 A1 | 3/2011 | Khoshnevis | |
| 2012/0038074 A1 | 2/2012 | Khoshnevis | |
| 2013/0004610 A1 | 1/2013 | Hartmann et al. | |
| 2013/0059025 A1 | 3/2013 | Khoshnevis | |
| 2013/0108726 A1* | 5/2013 | Uckelmann | B29C 64/176 |
| | | | 425/375 |
| 2014/0306379 A1 | 10/2014 | Hartmann et al. | |
| 2014/0308381 A1 | 10/2014 | Khoshnevis | |
| 2015/0017272 A1* | 1/2015 | Donaldson | B29C 64/153 |
| | | | 425/375 |
| 2015/0070452 A1 | 3/2015 | Motoyanagi | |
| 2015/0291921 A1* | 10/2015 | Rives | B22F 10/10 |
| | | | 425/130 |
| 2016/0001507 A1 | 1/2016 | Hartmann et al. | |
| 2016/0083956 A1 | 3/2016 | Khoshnevis | |
| 2016/0089720 A1* | 3/2016 | Kamakura | B29C 64/209 |
| | | | 419/53 |
| 2016/0244980 A1* | 8/2016 | Urban | B44C 1/26 |
| 2017/0157841 A1* | 6/2017 | Green | B29C 64/393 |
| 2017/0348905 A1* | 12/2017 | Fey | B22F 10/20 |
| 2018/0065208 A1* | 3/2018 | Mori | B22F 12/88 |
| 2018/0141272 A1 | 5/2018 | Hartmann et al. | |
| 2019/0084239 A1* | 3/2019 | Carlson | B29C 64/393 |
| 2019/0270254 A1* | 9/2019 | Mark | B29C 64/295 |
| 2019/0375014 A1* | 12/2019 | Kernan | B22F 10/20 |
| 2020/0114422 A1* | 4/2020 | Mark | B22F 1/0085 |

FOREIGN PATENT DOCUMENTS

| | | |
|---|---|---|
| WO | 2005/070657 | 8/2005 |
| WO | 2005/097476 | 10/2005 |
| WO | 2011/120505 | 10/2011 |
| WO | 2013/029594 | 3/2013 |

OTHER PUBLICATIONS

Patent Translate, "Description CN-203887172-U", Jun. 9, 2021, EPO and Google. (Year: 2021).*

International Search Report dated Nov. 29, 2017 in International (PCT) PCT/EP2017/069690.

* cited by examiner

DEVICE FOR PRODUCING AT LEAST ONE THREE-DIMENSIONAL LAMINATE FOR THE CONSTRUCTION INDUSTRY

BACKGROUND OF THE INVENTION

The present invention concerns an apparatus for producing at least one three-dimensional laminate for the construction industry from a plurality of layers of particulate material, which are arranged in mutually superposed relationship on a printing platform.

The invention also aims to provide a process for producing at least one three-dimensional laminate for the construction industry with an apparatus.

Apparatuses of the kind set forth in the opening part of this specification are already part of the state of the art and are disclosed for example in U.S. Pat. No. 7,104,773 B2. Such apparatuses have at least one coating device which can apply a material such as particulate material to a printing platform. In that case, application can be effected in the form of a material layer. Subsequently, the previously applied material is hardened by a printing head at locally predetermined regions for example by applying a binding agent or by the influence of heat. It is shown that not just one coating device is used in an upstream-disposed position in relation to the movement of the printing head, but two devices. If the printing head moves for example in a direction A, then a first printing device applies the material, while if the printing head moves in the direction B then the coating is applied by a further upstream-disposed coating device. It can thus be said that the printing head is disposed between two coating devices, and depending on the direction in which the printing head moves, a first or a second coating device applies the material which is to be hardened. Nonetheless the coating devices and the printing head are connected together in such a way that the coating devices are always moved together upon a movement of the printing head. The coating devices are not mounted movably independently of each other and independently of the printing head. That can lead to restrictions in terms of suitability for use of the apparatus and also longer cycle times in the production of a laminate.

SUMMARY OF THE INVENTION

The object of the invention is to avoid the above-described disadvantages and to provide an apparatus which is improved over the state of the art and also a process.

If the at least two coating devices and the at least one printing head are respectively displaceable relative to each other then for example one of the coating devices can be filled with the printing material—a particulate material—while the printing head and the second coating device are displaced over the printing platform and a printing operation is performed. It is thus possible for the second coating device to apply particulate material on the printing platform, which is subsequently bonded by the application of bonding agent by the printing head to the locally predetermined region. If the second coating device has to be filled with particulate material then the first coating device can apply a further layer of the particulate material and the printing head can bond same. Particularly when dealing with laminates of large volume, as are required in particular in the construction industry, a large amount of particulate material is necessary. That large amount of particulate material has to be applied in layer thicknesses of uniform dimensions on the printing platform or to layers of particulate material, which are already disposed on the printing platform. Thus, somewhat more time is required for filling the coating devices by virtue of the large amount of particulate material. A filling operation would thus entail a delay in the printing operation, and for that reason independent movement of the filling devices and the printing head is necessary to achieve fast cycle speeds.

It has proven to be particularly advantageous if each of the at least two coating devices and the at least one printing head have respective autonomous drive means (drivers). By virtue of the autonomous independent drive means the at least one coating device and the at least one printing head can not only carry out different movements, but can also move at different speeds. That is also made possible by the at least two coating devices being drivable by a robot and/or a linear motor. In that case, the robot has a robot arm which is in contact with a respective coating device and moves it over the printing platform. By virtue of the precision of the robot it is possible to apply uniform layer thicknesses and to perform movements in all three directions in space. The printing head can also be driven by a further robot, but it can also be moved directly by a drive unit like for example an electric motor over the printing platform.

It is also advantageous that the at least two coating devices and the at least one printing head are mounted respectively displaceably relative to each other along a longitudinal guide of the at least one printing frame, and the at least one printing head is arranged between the at least two coating devices. By virtue of the printing head being arranged between the coating devices and the movement along a common longitudinal guide, a coating device is always disposed upstream of the printing head in a movement along the longitudinal guide and can thus apply particulate material which is subsequently hardened by the printing head. There are therefore no 'idle travels' in the movement of the printing head as a printing operation always takes place in the movements thereof along the longitudinal guide. By virtue of the fact that the return movement of one of the at least two coating devices into its filling position for the filling operation—preferably at a rapid speed—and the movement of the at least one printing head involving discharge of the at least one binding agent—preferably at a printing speed—take place at the same time, the advantage of the short cycle times is additionally enhanced.

It is advantageous in that respect that the process for producing the laminate includes the following working steps:

a. filling at least one of the at least two coating devices with particulate material, b. applying a layer of the particulate material on the printing platform by the at least one coating device, and c. delivering at least one binding agent at the locally predetermined regions by the at least one printing head.

BRIEF DESCRIPTION OF THE DRAWINGS

Further details and advantages of the present invention are discussed more fully hereinafter by means of the specific description with reference to the embodiments by way of example shown in the Figures in which.

DETAILED DESCRIPTION OF THE INVENTION

Figure 1:
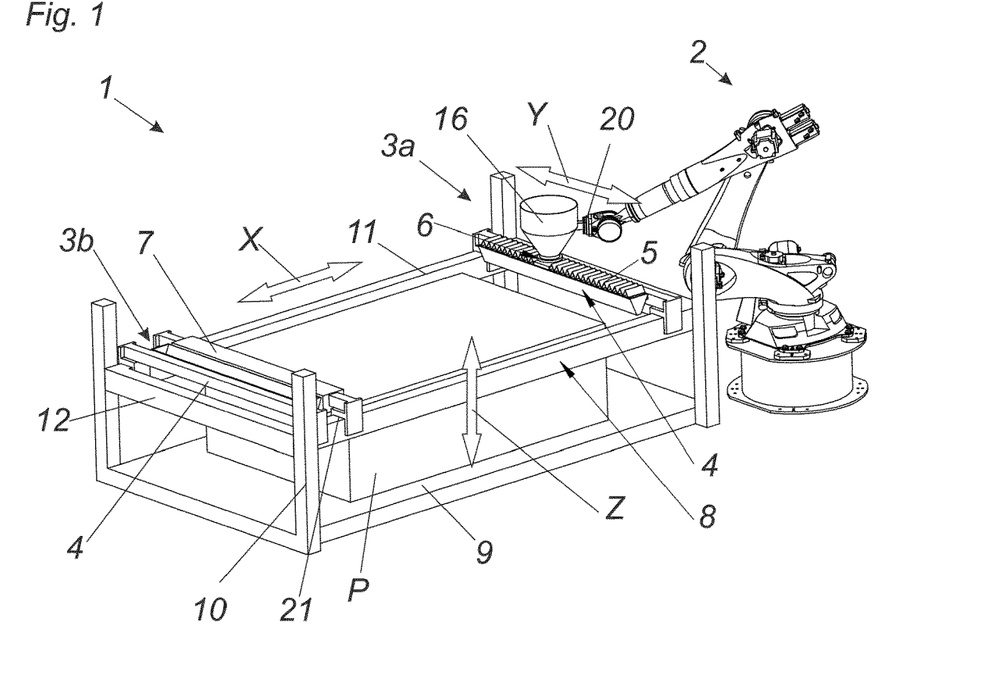
FIG. 1 shows an apparatus having a robot.

FIG. 1 shows the apparatus 1 for producing at least one three-dimensional laminate SK for the construction industry from a plurality of layers of particulate material P, which are arranged in mutually superposed relationship on a printing platform 9 and which are consolidated at locally predetermined regions and are connected together to form at least one three-dimensional laminate SK. In that arrangement, the printing frame 8 is mounted movably along the Z-axis (in respect of height and depth) at at least one rising guide 10. The at least one coating device 3a, 3b and the at least one printing head 7 are mounted movably over the printing platform 9 on the printing frame 8. In other words: when the printing frame 8 rises or falls in the direction of the spatial direction Z the at least one coating device 3a, 3b mounted movably on the printing frame 8 and the at least one printing head 7 are also moved. The printing frame 8 has at least one longitudinal guide 11 along which the printing head 7 and the at least one coating device 3a, 3b are respectively movably mounted. The movement of the at least one printing head 7 in this case is effected by way of an autonomous driver 21 which for example can be formed by an electric motor or a similar drive means having a tooth arrangement or a belt drive. It would also be conceivable for the at least one printing head 7 to be moved by an autonomous robot arm 20 of a robot 2. As the at least two coating devices 3a, 3b and the at least one printing head 7 each have a respective autonomous driver 2, 21, it is possible to implement different movements in the region of the printing frame 8 and also different speeds in displacement of the printing head 7 and the at least two coating devices 3a, 3b. If the at least two coating devices 3a, 3b are drivable by a respective robot 2, it is thus possible to implement different movements in the three directions in space X, Y and Z. In other words, the at least two coating devices 3a, 3b are independently movable with respect to each other, and the printing head 7 is independently movable relative to each of the at least two coating devices 3a, 3b. Thus in the directions X, Y, by the movement of the robot 2, the particulate material P is applied layer-wise on the printing platform 9. The coating devices 3a, 3b each have a respective intermediate storage means (storage container) 16. That intermediate storage container 16 is coupled to a delivery device 4 by way of a coupling 18 (see FIG. 4). The delivery device 4 is of a funnel-shaped hopper configuration and at the underside has a doctor blade which distributes the particulate material P in a uniform layer on the printing platform 9. The elongated funnel-shaped delivery device 4 has an opening at the top side and also at its underside, along its longitudinal extent. At the opening at the top side the particulate material P is sprinkled into the interior of the delivery device 4 by the intermediate storage container 16 mounted movably along the delivery device 4. A metering device 6 under the intermediate storage container 16 discharges the necessary amount of particulate material P from the intermediate storage container 16 into the delivery device 4. Subsequently the particulate material P is delivered by way of the lower opening which extends along the delivery device 4 to the printing platform 9 or to layers of the particulate material, which are already on the printing platform 9. The metering device 6 can be formed for example by a flap or a valve which regulates the through-flow quantity of the required particulate material P or simply enables or stops the feed of particulate material. The metering device 6 can be actuated for example electrically, pneumatically or also mechanically. The opening along the longitudinal extent at the top side of the delivery device 4 for introducing the particulate material P has a flexible cover 5. The region which is not covered by the intermediate storage container 16 is closed off by that flexible cover 5. This therefore prevents particulate material P from accidentally dropping out of the upper opening of the delivery device 4 on to the printing platform 9 or on to layers of particulate material P, that are already on the printing platform 9, or being flung or blown out by the movements of the delivery device 4 as it moves. In other words, the cover prevents particulate material P from issuing due to external influences. The delivery device 4 serves not only for delivery of the particulate material P to the printing platform 9 disposed therebeneath, but also serves at the same time as a guide for the intermediate storage container 16 mounted movably thereat. Thus guidance for the intermediate storage container 16 along the direction X is effected by way of the longitudinal guide 11, and along the direction Y along the delivery device 4 which is in the form of a guide or which is provided with a guide.

Figure 2:
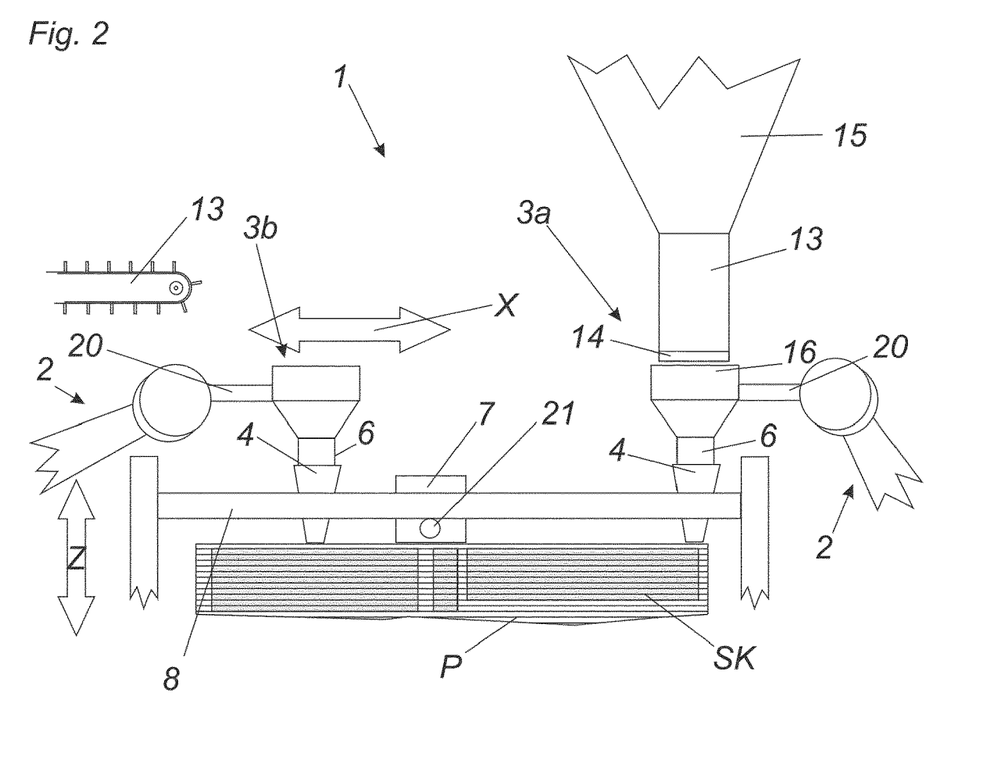
FIG. 2 is a diagrammatic view of an apparatus having two coating devices.

FIG. 2 diagrammatically shows an apparatus 1 having a coating device 3a and a coating device 3b. The coating devices 3a, 3b are drivable, movable or guidable separately from each other by way of robot arms 20 along the spatial axes X, Y and Z. A container 15 serves as a mixer or as a reservoir for the particulate material P which passes into the intermediate storage container 16 by a filling device 13. As required, the necessary amount of particulate material P is delivered into the intermediate storage container 16 by way of a discharge device 14. From the intermediate storage container 16 the particulate material P passes by way of the metering device 6 into the delivery device 4. The particulate material P is distributed layer-wise on the printing platform 9 by the movements of the robot arm 20. The filling device 13 can also be formed by for example a conveyor belt which fills the intermediate storage containers 16 in the filling position BPa, BPb of the respective coating device 3a, 3b. After application of the layer of particulate material by the coating devices 3a, 3b the printing head 7 moves over the previously applied layer of particulate material P and delivers at least one binding agent at locally predetermined regions in order to consolidate the particulate material P. Therefore, a laminate SK is formed after multiple repetitions of the layer structuring and consolidation at the locally predetermined regions.

Figure 3A:
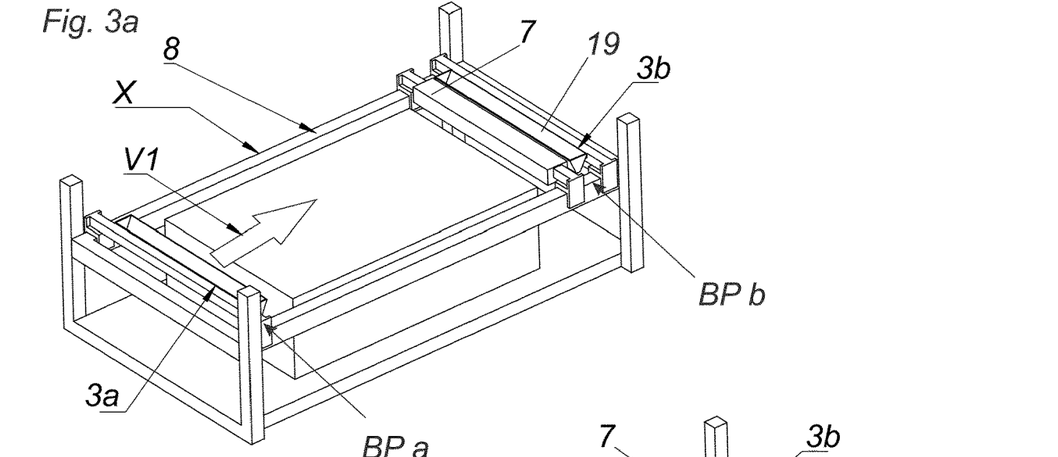
FIGS. 3*a*-3*f* show different movement processes of the coating devices and the printing head.

FIG. 3a shows how the coating device 3a applies a layer of the particulate material P at a material application speed V1 while the printing head 7 remains in its position and the second coating device 3b remains in its filling position BPb in order to be filled with particulate material P.

Figure 3B:
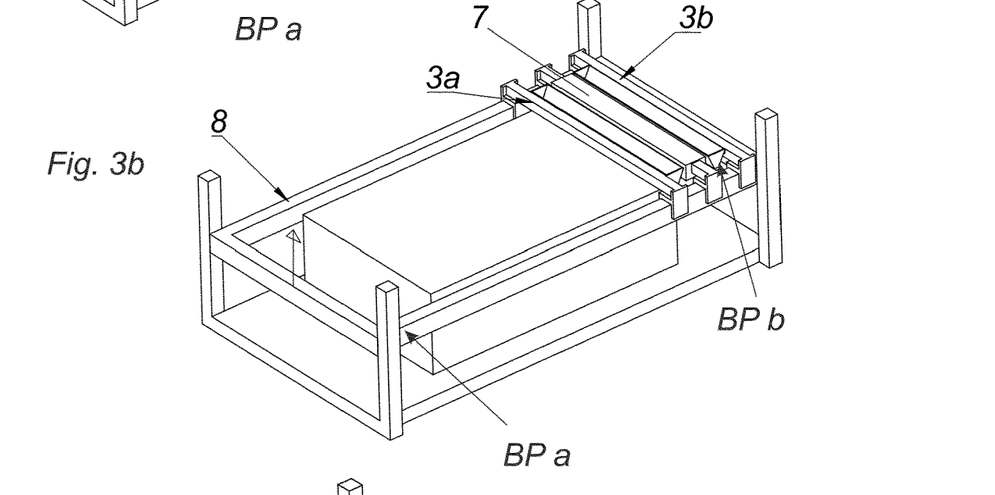

FIG. 3b shows that the coating device 3a has arrived at the printing head 7 and in its travel there has applied a layer of particulate material P. The second coating device 3b has already been filled with particulate material P in the filling position BPb. The printing head 7 and the coating devices 3a, 3b are now lifted by a predetermined distance above the at least one printing frame 8 in order to adjust the thickness of the layer of particulate material P. Preferably that distance for lifting the printing frame 8 is between 2 mm and 15 mm, particularly preferably between 8 mm and 12 mm.

Figure 3C:
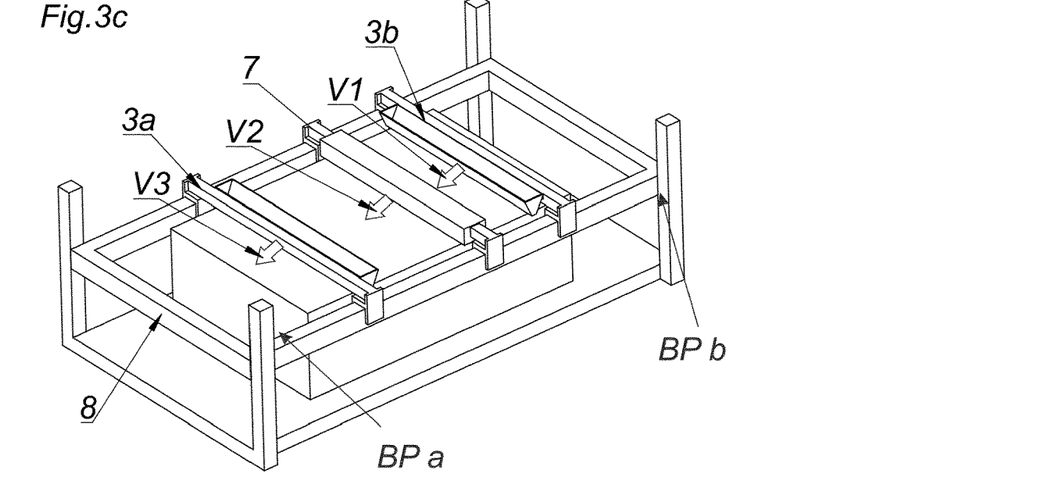

FIG. 3c shows how the coating device 3a moves back into its filling position BPa at a rapid speed V3. The printing head 7 moves at a lower speed, the printing speed V2, in the same direction as the coating device 3a, at the same time. At that moment the second coating device 3b moves at a material application speed V1 in the same direction as the printing head 7. In that case the next layer of particulate material P is applied.

Figure 3D:
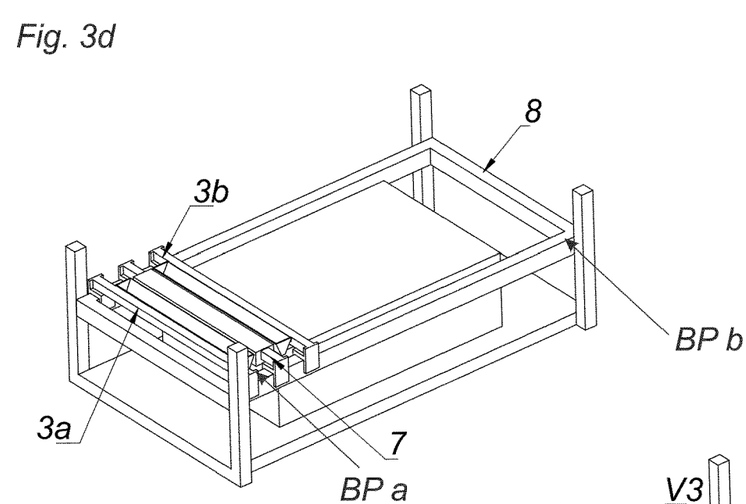

FIG. 3d shows how the at least one printing frame 8 is moved upwardly again by at least the height of the last-applied layer in order to be able to initiate the next working process. The coating device 3a is in the filling position BPa and is filled or has already been filled with the particulate material P.

Figure 3E:
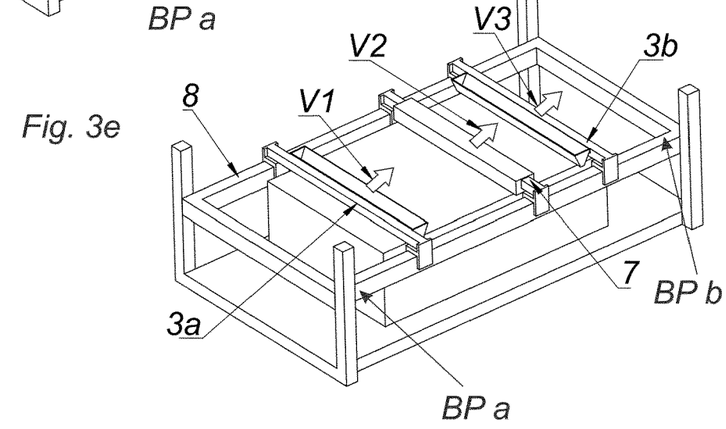

FIG. 3e shows how the coating device 3b moves back into its filling position BPb at the rapid speed V3. The printing head 7 also moves in the same direction at the printing speed V2, followed by the coating device 3a which moves at the material application speed V1. In that case the next layer of particulate material P is applied.

Figure 3F:
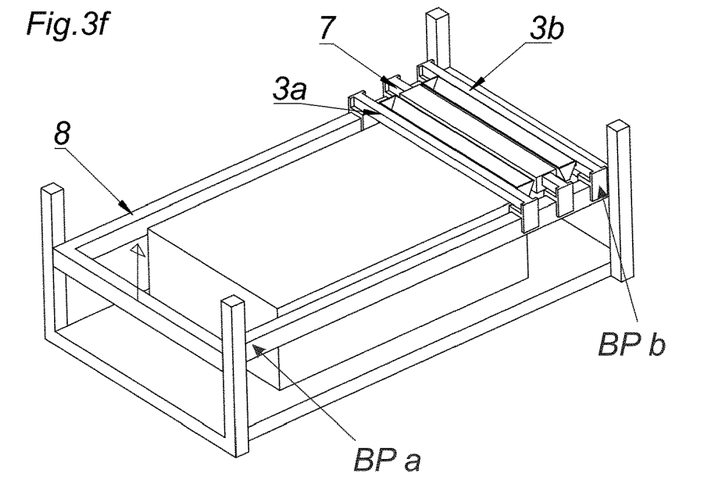

FIG. 3f shows the coating device 3b in its filling position BPb. The at least one printing frame 8 is raised in that position again by the thickness of layer which was previously applied. The next printing operation can be initiated, the working steps can be repeated as described with reference to FIGS. 3b through 3f in order to build up a laminate SK.

In relation to FIGS. 3a through 3f, the at least two coating devices 3a and 3b and the at least one printing head 7, in the course of the process, are respectively moved relative to each other, preferably along at least one longitudinal guide 11. The at least two coating devices 3a, 3b can in that case be moved into a respective filling position BPa, BPb, for filling with particulate material P, in the region of the at least one printing frame 8. In that case, the at least two coating devices 3a, 3b are moved exclusively by robots 2. That is also apparent moreover in FIG. 2. In that respect it is provided that the layer-wise application of particulate material P on the printing platform 9 or on layers which are already disposed on the printing platform 9 by one of the at least two coating devices 3a, 3b, preferably at a material application speed V1, and the movement of the at least one printing head 7 with the delivery of the at least one bonding agent—preferably at a printing speed V2— take place at the same time. It is further provided that the return movement of one of the at least two coating devices 3a, 3b into its filling position BPa for the filling operation—preferably moving at a rapid speed V3— and the movement of the at least one printing head 7 with delivery of the at least one binding agent—preferably at a printing speed V2— take place at the same time. It is also provided that the rapid speed V3 is higher than the printing speed V2 and/or the printing speed V2 is higher than the material application speed V1. Thus the short cycle times and also the large amount of material application using particulate material P, which are necessary for the production of laminates SK for the construction industry, are achieved in that way. The apparatus 1 is not intended to be used only for the production of prototypes or similar, like conventional 3D printing apparatuses. The apparatus 1 can produce mass-produced products for the construction industry by virtue of its short cycle times.

Figure 4:
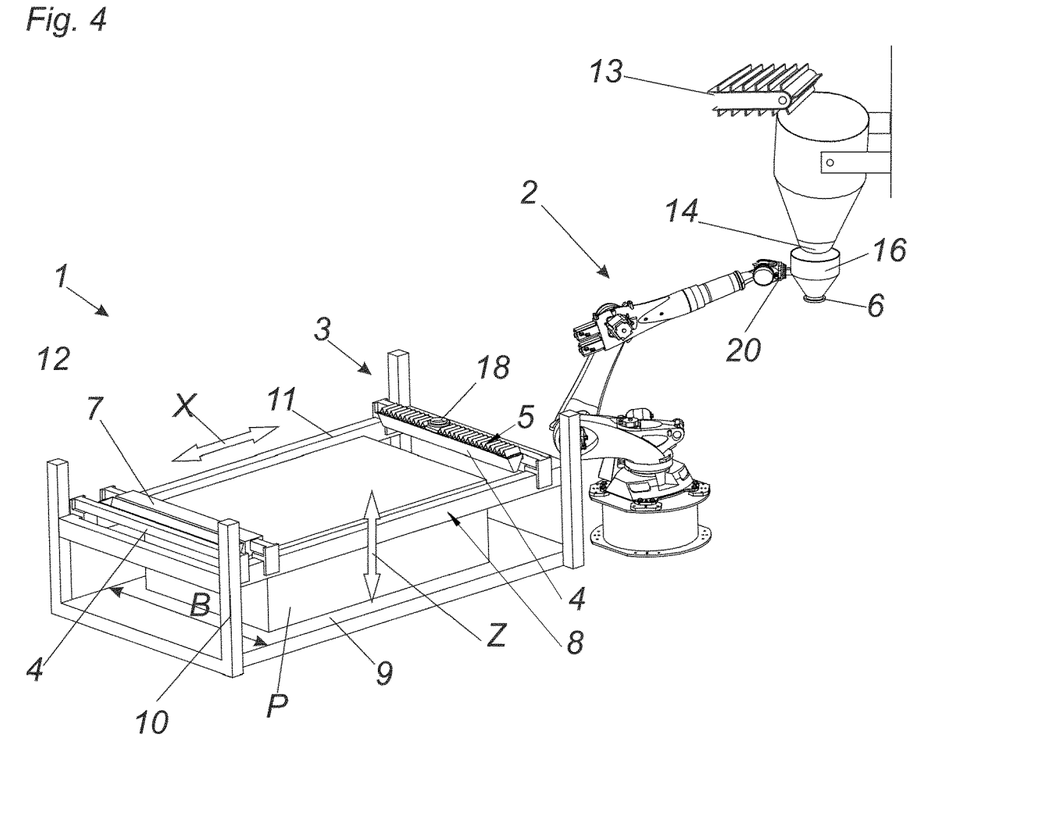
FIG. 4 shows filling of the intermediate storage means.

FIG. 4 shows how the intermediate storage container 16 can be removed from the coupling 18 by the robot arm 20 of the robot 2, in order to be able to fill same by a filling device 13. The filling device 13, in this embodiment in the form of a conveyor belt, conveys material into a funnel hopper, at the underside of which is arranged a discharge device 14. That delivers the necessary amount of particulate material P to the intermediate storage container 16. The metering device 6 also prevents the particulate material P falling out of the intermediate storage container 16 on the way from filling to the coupling 18. After the operation of filling the intermediate storage container 16 the intermediate storage means 16 is moved to the coupling 18 again by the robot arm 20 and there connected to the delivery device 4. The material in the intermediate storage container 16 can now be transferred into the delivery device 4. For simplification purposes FIG. 4 shows only one robot 2, it is however possible to use a plurality of robots 2 and also a plurality of intermediate storage containers 16.

Figure 5:
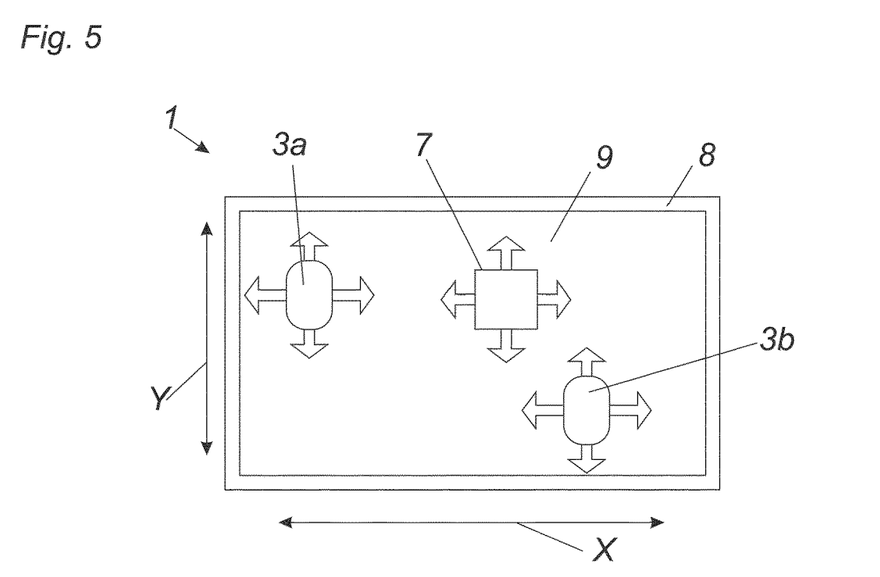
FIG. 5 is a diagrammatic view of the movement processes of the printing head and the coating devices.

FIG. 5 diagrammatically shows the movements of the coating devices 3a, 3b along the directions X, Y. The movement in the direction Z in which the printing frame 8 is movable upwardly and downwardly is not shown. That is illustrated in FIGS. 1 and 2. Positions along the directions X, Y of the coating devices 3a, 3b can be freely selected relative to each other independently by the robot arms 20. Each coating device 3a, 3b in itself has its own connection to its own robot arm 20. The position of the printing head 7 can be selected independently of the position of the coating devices 3a, 3b, along the directions X, Y. Accordingly the coating devices 3a, 3b can distribute the particulate material P on the printing platform 9 independently of each other. Subsequently the particulate material P is consolidated by the printing head 7, with the delivery of the at least one binding agent. It is also provided that the at least two coating devices 3a, 3b and the at least one printing head 7 are movable at the same time at different speeds V1, V2 and V3.

Figure 6:
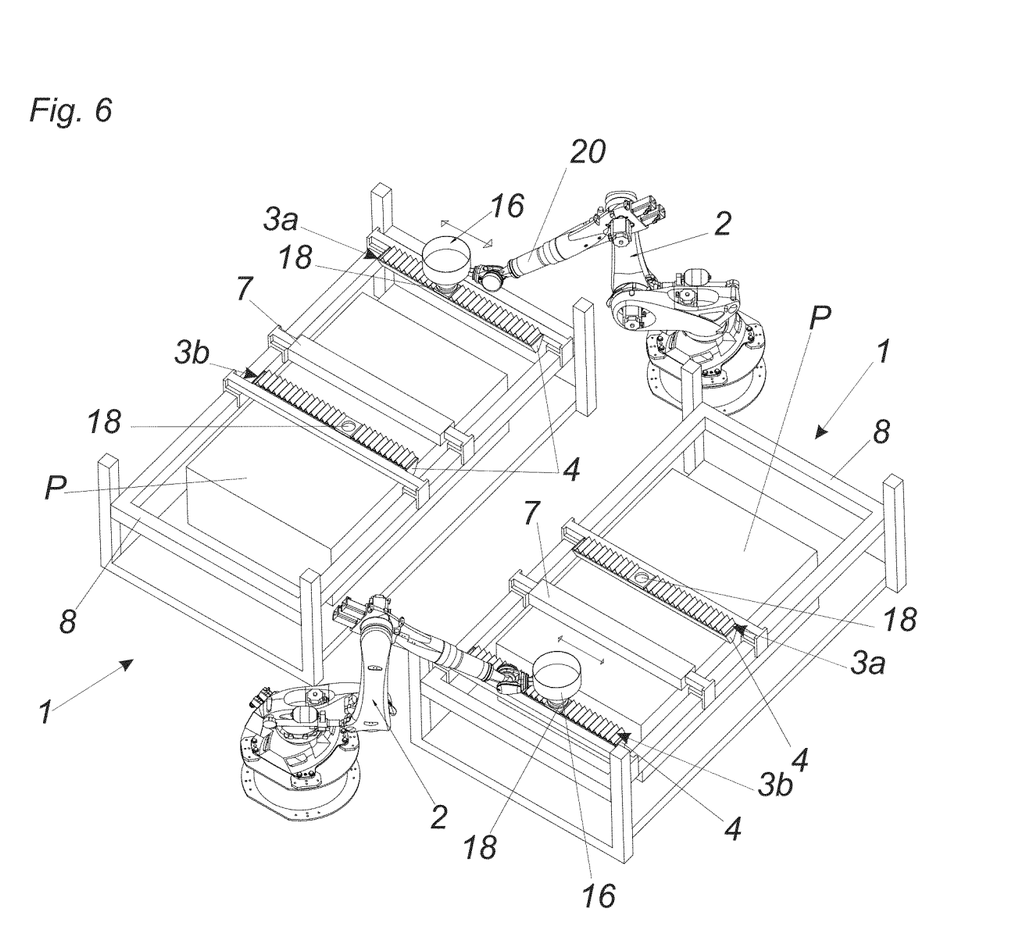
FIG. 6 shows an arrangement comprising a plurality of apparatuses.

FIG. 6 shows how a plurality of robots 2 serve a plurality of apparatuses 1. In this embodiment two apparatuses 1 are shown arranged in mutually juxtaposed relationship, beside which there are two robots 2. The robot arms 20 thereof are or can be connected to the intermediate storage containers 16. Accordingly a robot 2 with its robot arm 20 can uncouple an intermediate storage means 16 from a delivery device 4 by way of the coupling 18 and fit it on to another delivery device 4 of another apparatus 1. In that way a robot 2 can perform the operation of filling a plurality of coating devices 3a, 3b. A robot 2 is capable of alternately performing the filling operation or the movements of the coating devices 3a, 3b on different apparatuses 1.

The invention claimed is:

1. An apparatus for producing a three-dimensional laminate from a plurality of layers of particulate material, said apparatus comprising:
   a printing frame,
   a rising guide mounted to the printing frame such that the printing frame is movable in a vertical direction along the rising guide,
   at least two coating devices for layer-wise application of the particulate material on a printing platform, each of the at least two coating devices being mounted to the printing frame so as to be movable in a horizontal direction along the printing frame and so as to be movable in a vertical direction with the printing frame along the rising guide, and each of the at least two coating devices having a respective intermediate storage container for storing the particulate material to be applied by the respective one of the at least two coating devices, and
   a printing head for delivery of a binding agent at locally predetermined regions of the plurality of layers of particulate material, the printing head being mounted so as to move relative to the printing frame, and the printing head having a respective storage container for storing the binding agent to be applied by the printing head, wherein the at least two coating devices are independently movable with respect to each other, and the printing head is independently movable relative to each of the at least two coating devices.

2. The apparatus as set forth in claim 1, wherein each of the at least two coating devices and the printing head has a respective autonomous driver.

3. The apparatus as set forth in claim 1, wherein each of the at least two coating devices is drivable by a robot and/or a linear motor.

4. The apparatus as set forth in claim 1, wherein, during an operation of filling the respective intermediate storage container of a first coating device of the at least two coating devices, a second coating device of the at least two coating devices is movable for application of particulate material.

5. The apparatus as set forth in claim 1, wherein the at least two coating devices and the printing head are simultaneously movable at different speeds.

6. The apparatus as set forth in claim 1, wherein the at least two coating devices and the printing head are mounted movably relative to each other respectively along a longitudinal guide of the printing frame, the printing head being arranged between the at least two coating devices.

7. The apparatus as set forth in claim 1, wherein the at least two coating devices are mounted movably along a longitudinal guide.

8. The apparatus as set forth in claim 1, wherein the printing head is mounted movably along a longitudinal guide.

9. The apparatus as set forth in claim 1, wherein the respective intermediate storage container for each of the at least two coating devices is provided along a longitudinal guide.

10. An apparatus for producing a three-dimensional laminate from a plurality of layers of particulate material, said apparatus comprising:
   a printing frame,
   a rising guide mounted to the printing frame such that the printing frame is movable in a vertical direction along the rising guide,
   at least two coating devices for layer-wise application of the particulate material on a printing platform, each of the at least two coating devices being mounted to the printing frame so as to be movable in a horizontal direction along the printing frame and so as to be movable in a vertical direction with the printing frame along the rising guide, and each of the at least two coating devices having a respective intermediate storage container for storing the particulate material to be applied by the respective one of the at least two coating devices, and
   a printing head for delivery of a binding agent at locally predetermined regions of the plurality of layers of particulate material, the printing head being mounted so as to move relative to the printing frame, and the printing head having a respective storage container for storing the binding agent to be applied by the printing head,
   wherein the at least two coating devices are independently movable with respect to each other, and the printing head is independently movable relative to each of the at least two coating devices, and
   wherein each of the at least two coating devices and the printing head has a respective autonomous driver such that the at least two coating devices and the printing head are simultaneously movable relative to the printing platform at different speeds.

11. The apparatus as set forth in claim 10, wherein each of the at least two coating devices is drivable by a robot and/or a linear motor.

12. The apparatus as set forth in claim 10, wherein, during an operation of filling the respective intermediate storage container of a first coating device of the at least two coating devices, a second coating device of the at least two coating devices is movable for application of particulate material.

13. The apparatus as set forth in claim 10, wherein the at least two coating devices and the printing head are mounted movably relative to each other respectively along a longitudinal guide of the printing frame, the printing head being arranged between the at least two coating devices.

14. The apparatus as set forth in claim 10, wherein the at least two coating devices are mounted movably along a longitudinal guide.

15. The apparatus as set forth in claim 10, wherein the printing head is mounted movably along a longitudinal guide.

16. The apparatus as set forth in claim 10, wherein the respective intermediate storage container for each of the at least two coating devices is provided along a longitudinal guide.

* * * * *